(12) United States Patent
Finchelstein et al.

(10) Patent No.: US 10,382,493 B2
(45) Date of Patent: Aug. 13, 2019

(54) METHOD AND SYSTEM FOR CREATING AND RECEIVING NEUTRALIZED DATA ITEMS

(71) Applicant: CHECK POINT SOFTWARE TECHNOLOGIES LTD., Tel Aviv (IL)

(72) Inventors: Daniel Finchelstein, Rishon Lezion (IL); Amnon Perlmutter, Givatayim (IL)

(73) Assignee: CHECK POINT SOFTWARE TECHNOLOGIES LTD., Tel Aviv (IL)

( * ) Notice: Subject to any disclaimer, the term of this patent is extended or adjusted under 35 U.S.C. 154(b) by 462 days.

(21) Appl. No.: 15/177,352

(22) Filed: Jun. 9, 2016

(65) Prior Publication Data

US 2017/0359388 A1 Dec. 14, 2017

(51) Int. Cl.
*H04L 29/06* (2006.01)
*G06F 16/18* (2019.01)

(52) U.S. Cl.
CPC ........ *H04L 63/205* (2013.01); *G06F 16/1873* (2019.01); *H04L 63/0281* (2013.01); *H04L 63/145* (2013.01); *H04L 63/1416* (2013.01); *H04L 63/1425* (2013.01); *H04L 63/1441* (2013.01); *H04L 63/20* (2013.01)

(58) Field of Classification Search
CPC ............... H04L 63/205; H04L 63/1425; H04L 63/1441; G06F 17/3023
See application file for complete search history.

(56) References Cited

U.S. PATENT DOCUMENTS

| | | | | |
|---|---|---|---|---|
| 8,108,347 | B2 * | 1/2012 | Lara | G06F 11/0709 707/638 |
| 8,353,028 | B2 * | 1/2013 | Lalonde | G06F 21/566 726/22 |
| 8,392,705 | B2 * | 3/2013 | Borden | G06F 17/30097 713/165 |
| 9,354,968 | B2 * | 5/2016 | Wenzel | G06F 11/0727 |
| 9,426,175 | B2 * | 8/2016 | Deyo | H04L 63/1408 |

* cited by examiner

*Primary Examiner* — Jason K Gee
*Assistant Examiner* — Abdullah Almamun
(74) *Attorney, Agent, or Firm* — Mark M. Friedman

(57) ABSTRACT

Computerized methods and systems receive neutralized data items on a first entity from a second entity over a network by receiving a first data item from the second entity. A security protocol that applies rules and policies is applied to the first data item to create a second data item that is a neutralized version of the first data item. The first data item and the second data item are converted into comparable forms. The second data item is analyzed against the first data item by comparing the comparable forms to form at least one comparison measure. The second data item is received on the endpoint if the at least one comparison measure satisfies a threshold criterion. The security protocol is modified to adjust the applied rules and policies if the at least one comparison measure does not satisfy the threshold criterion.

17 Claims, 6 Drawing Sheets

METHOD AND SYSTEM FOR CREATING AND RECEIVING NEUTRALIZED DATA ITEMS

TECHNICAL FIELD

The present invention relates to methods and systems for preventing malware infections and information exfiltration.

BACKGROUND OF THE INVENTION

Malware is any software used to disrupt computer operations, gather sensitive information, or gain access to private assets residing in computer systems. This can lead to the malware creator or other unauthorized parties gaining access to the computer system and private information stored on the computer system being compromised via information exfiltration. Malware includes computer viruses, worms, trojan horses, spyware, adware, key loggers, and other malicious programs. These programs can appear in the form of computerized code, scripts, and other software, which in many instances gain access to the computer systems through, for example, e-mail attachments and file downloads through web browsers. Certain types of malware, such as, ransomware, restrict access to the infected computer system in some way, such as by systematically encrypting files on the computer system hard drive, and demand the computer system user to pay a ransom to the malware operator to remove the restriction.

Software, such as, for example, anti-virus, anti-spyware, anti-malware and firewalls, are depended upon by computer users for protecting against malware and other malicious attacks, by limiting, or preventing, the opening of e-mail attachments and the download of files on the computer systems.

SUMMARY OF THE INVENTION

The present invention is directed to computerized methods and systems, which provide mechanisms for receiving neutralized data items from and on a network, and for adjusting the security protocol used to create the neutralized data items.

Embodiments of the present invention are directed to a method for receiving data items on a first entity from a second entity over a network. The method comprises: receiving a first data item from the second entity; applying a security protocol, that applies rules and policies, to the first data item to create a second data item; and analyzing the second data item against the first data item by comparing a rendered version of the second data item with a rendered version of the first data item to form at least one comparison measure of the second data item.

Optionally, the method further comprises: receiving the second data item on the first entity if the at least one comparison measure satisfies a threshold criterion.

Optionally, the method further comprises: modifying the security protocol if the at least one comparison measure dissatisfies the threshold criterion.

Optionally, the method further comprises: applying the modified security protocol to the first data item to create a subsequent second data item.

Optionally, the method further comprises: analyzing the subsequent second data item against the first data item by comparing a rendered version of the subsequent second data item with the rendered version of the first data item to form at least one comparison measure of the subsequent second data item.

Optionally, the method further comprises: repeating the modifying of the security protocol and creating the subsequent second data item until the at least one comparison measure of the subsequent second data item satisfies a threshold criterion.

Optionally, the method further comprises: taking at least one action if the at least one comparison measure dissatisfies the threshold criterion.

Optionally, at least one of the first or second entities includes an endpoint, and the at least one action is selected from the group consisting of: quarantining the first data item, displaying a message on the endpoint, disabling use of the endpoint, disconnecting the endpoint from the network, notifying a system administrator, and a combination thereof.

Optionally, the method further comprises: generating the rendered version of the second data item and the rendered version of the first data item by converting each of the respective data items into a comparable form.

Optionally, the comparable form includes an image file, and the analyzing includes comparing at least a subset of pixels of the image file rendered from the second data item with at least a subset of pixels of the image file rendered from the first data item.

Optionally, the applying the security policy includes identifying potentially malicious or restricted components of the first data item.

Optionally, applying the security policy further includes removing the components of the first data item identified as potentially malicious or restricted.

Optionally, the first entity includes at least one of an endpoint or the network.

Optionally, the second entity includes at least one of an endpoint or the network.

Optionally, the applying the security policy to create the second data item includes: decomposing the first data item into a plurality of components, and combining at least a subset of the plurality of components.

Optionally, the second data item is a neutralized version of the first data item.

Optionally, the at least one comparison measure is selected from the group consisting of: the fidelity of the second data item, the absolute amount of disk space consumed by the second data item, the ratio between the amount of disk space consumed by the second data item and the first data item, the time taken to perform the generating of the second data item, the resources consumed by the generating of the second data item, the time taken to perform the analyzing the second data item against the first data item, the resources consumed by the analyzing the second data item against the first data item, and a combination thereof.

Embodiments of the present invention are directed to a computer system for sending data items from a first entity to a second entity over a network. The computer system comprises: a storage medium for storing computer components; and a computerized processor for executing the computer components. The computer components comprise: a computer module configured for: receiving a first data item from the first entity; applying a security protocol, that applies rules and policies, to the first data item to create a second data item; and analyzing the second data item against the first data item by comparing a rendered version of the second data item with a rendered version of the first data item to form at least one comparison measure of the second data item.

Optionally, the computer module is further configured for: sending the second data item to the second entity if the at least one comparison measure satisfies a threshold criterion.

Optionally, the computer module is further configured for: modifying the security protocol if the at least one comparison measure dissatisfies the threshold criterion.

Optionally, the computer module is further configured for: applying the modified security protocol to the first data item to create a subsequent second data item.

Optionally, the computer module is further configured for: modifying the security protocol if the amount of resources consumed by the computer module satisfies a threshold criterion.

Optionally, the computer system includes a gateway installed between the first and second entities, and the first data item is sent from the first entity to the second entity via the gateway.

Optionally, the computer system includes a server installed between the first and second entities, and the first data item is sent from the first entity to the second entity via the server.

Embodiments of the present invention are directed to a method for adjusting the security level of data items received on a first entity from a second entity over a network. The method comprises: receiving a first data item from the second entity; applying a security protocol, that applies rules and policies, to the first data item to create a second data item; determining if the applying the security protocol satisfies a threshold criterion; and analyzing the second data item against the first data item by comparing a rendered version of the second data item with a rendered version of the first data item to form at least one comparison measure of the second data item if the applying the security protocol satisfies the threshold criterion, and modifying the security protocol if the applying the security protocol dissatisfies the threshold criterion.

Optionally, the threshold criterion is selected from the group consisting of: the amount of resources consumed by the applying the security protocol, the absolute amount of disk space consumed by the second data item, the ratio between the amount of disk space consumed by the second data item and the first data item, the time taken to perform the applying the security protocol, and a combination thereof.

Embodiments of the present invention are directed to a method for transferring data items between an endpoint and a network. The method comprises: receiving a first data item from at least one of the network or the endpoint; applying a security protocol, that applies rules and policies, to the first data item to create a second data item; and analyzing the second data item against the first data item by comparing a rendered version of the second data item with a rendered version of the first data item to form at least one comparison measure of the second data item.

Optionally, the method further comprises: receiving the second data item on at least one of the endpoint or the network if the at least one comparison measure satisfies a threshold criterion.

Embodiments of the present invention are directed to a computer usable non-transitory storage medium having a computer program embodied thereon for causing a suitable programmed system to receive data items on a first entity from a second entity over a network, by performing the following steps when such program is executed on the system. The steps comprise: receiving a first data item from the second entity; applying a security protocol, that applies rules and policies, to the first data item to create a second data item; and analyzing the second data item against the first data item by comparing a rendered version of the second data item with a rendered version of the first data item to form at least one comparison measure of the second data item.

Embodiments of the present invention are directed to a computer usable non-transitory storage medium having a computer program embodied thereon for causing a suitable programmed system to adjust the security level of data items received on a first entity from a second entity over a network, by performing the following steps when such program is executed on the system. The steps comprise: receiving a first data item from the second entity, applying a security protocol, that applies rules and policies, to the first data item to create a second data item; determining if the applying the security protocol satisfies a threshold criterion; and analyzing the second data item against the first data item by comparing a rendered version of the second data item with a rendered version of the first data item to form at least one comparison measure of the second data item if the applying the security protocol satisfies the threshold criterion, and modifying the security protocol if the applying the security protocol dissatisfies the threshold criterion.

Embodiments of the present invention are directed to a computer usable non-transitory storage medium having a computer program embodied thereon for causing a suitable programmed system to transfer data items between an endpoint and a network, by performing the following steps when such program is executed on the system. The steps comprise: receiving a first data item from at least one of the network or the endpoint; applying a security protocol, that applies rules and policies, to the first data item to create a second data item; and analyzing the second data item against the first data item by comparing a rendered version of the second data item with a rendered version of the first data item to form at least one comparison measure of the second data item.

This document references terms that are used consistently or interchangeably herein. These terms, including variations thereof, are as follows:

A "computer" includes machines, computers and computing or computer systems (for example, physically separate locations or devices), servers, gateways, computer and computerized devices, processors, processing systems, computing cores (for example, shared devices), and similar systems, workstations, modules and combinations of the aforementioned. The aforementioned "computer" may be in various types, such as a personal computer (e.g. laptop, desktop, tablet computer), or any type of computing device, including mobile devices that can be readily transported from one location to another location (e.g. smartphone, personal digital assistant (PDA), mobile telephone or cellular telephone).

A "data item" refers to objects on a network or computer that contain data elements which can be propagated between multiple computers connected or linked via a network connection. Data items may be stored on a computer, for example, in a memory or the like, or may be pervasive data items which are non-storable due practical limitations such as, for example, cryptography protocols, permissions, and the like. Non-pervasive data items include files of different file types having file extensions which include, but are not limited to, *.doc, *.docx, *.xls, *.xlsx, *.ppt, *.pptx, *.pdf, *.rtf, *.txt, *.html, *.js, *.mht, *.tiff, *.bmp, *.jpg, *.gif, and *.png file extensions.

A "neutralized version", in the context of a data item, refers to a data item which has been modified or altered in some way, so as to reduce the security risk posed by such data items, or the risk of information exfiltration. Data items may be modified or altered to create neutralized versions by, for example, removing malicious, suspicious, or potentially malicious components or objects of the data items, such as, for example, the removal of macros from an incoming word processing file, or by removing restricted information from outgoing data items. The term "neutralized version", in the context of a data item, may also be interpreted in other words as a "secure version", "safe version", "secure copy", "safe copy", or "neutralized copy".

Unless otherwise defined herein, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE DRAWINGS

Some embodiments of the present invention are herein described, by way of example only, with reference to the accompanying drawings. With specific reference to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Attention is now directed to the drawings, where like reference numerals or characters indicate corresponding or like components. In the drawings.

DESCRIPTION OF THE PREFERRED EMBODIMENTS

Figure 1:
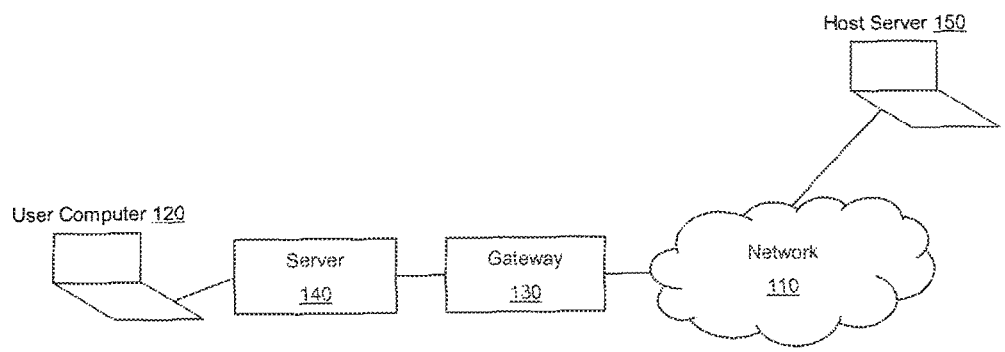
FIG. 1 is a diagram illustrating a system environment in which an embodiment of the invention is deployed.

The present invention is directed to computerized methods and systems, which provide mechanisms for receiving neutralized data items on an endpoint client over a network, sending neutralized data items to a network from an endpoint client, and for adjusting the security protocol used to create the neutralized data items. An agent, preferably installed on the endpoint client and/or a gateway and/or a server linked to the endpoint client through a network (e.g., the Internet), modifies incoming and/or outgoing data items to create neutralized versions of the incoming and/or outgoing data items. The modification of the incoming and/or outgoing data items is executed in accordance with a selectable security protocol that applies rules and policies to the incoming and/or outgoing data items, which can be adjusted if any of the neutralized data item do not meet certain threshold criteria.

Before explaining at least one embodiment of the invention in detail, it is to be understood that the invention is not necessarily limited in its application to the details of construction and the arrangement of the components and/or methods set forth in the following description and/or illustrated in the drawings and/or the examples. The invention is capable of other embodiments or of being practiced or carried out in various ways.

Refer now to FIG. 1, an illustrative example environment in which embodiments of the present disclosure may be performed over a network 110. The network 110 may be formed of one or more networks, including for example, the Internet, cellular networks, wide area, public, and local networks. The embodiments include a system 170 (FIGS. 2A and 2B), including, for example, an agent 160, installed on a gateway 130 and/or a server 140 connected to an endpoint client, for example, a user computer 120 (linked to the network 110). In certain non-limiting implementations, the server 140 may be, for example, a mail (i.e., electronic mail or e-mail) server. To better describe the operation and functionality of the system 170, the server 140 is described as mail server operable with a mail client in several subsequent sections of the present disclosure. Such exemplary descriptions of the server 140 as a mail server should not be taken to limit the server 140 to a specific type of server.

The agent 160 provides mechanisms for receiving neutralized data items on the user computer 120 from the network 110, receiving neutralized data items on the network 110 from the user computer 120, and for adjusting the security protocol used to create the neutralized data items. The system 170 may be alternatively deployed on a computer or module linked to a gateway and/or server. The mechanisms provided by the agent 160 for receiving neutralized data items on the user computer 120 from the network 110 reduce the risk of malware or ransomware infection on the user computer 120. The mechanisms provided by the agent 160 for receiving neutralized data items on the network 110 from the user computer 120 reduce the risk of exfiltration of restricted information, which may, for example, be caused by a malware infection on the user computer 120. Within the context of this document, the terms "restricted information" generally refers to information present on the user computer 120 that is private or sensitive and should not otherwise be distributed to any network, including the network 110.

In subsequent sections of the present disclosure, the operation and functionality of the system 170 is described within the context of scenarios in which data items are received on the user computer 120 from the network 110, or scenarios in which data items are received on the network 110 from the user computer 120. In many instances, the operation and functionality of the system 170 is described within the context of both of the aforementioned scenarios.

In a non-limiting example, a data item is received on the user computer 120 from a host server 150 linked to the network 110. The host server 150 represents numerous servers hosting, for example, web sites, accessible through web servers (not shown). In such a non-limiting example, the data item is received on the user computer 120 from the host server 150 via the gateway 130 (and the network 110), and is exemplified by a user of the user computer 120 downloading a file from such a web site. As such, the agent 160 of the system 170 is installed as part of the gateway 130, and performs actions which provide the above mentioned mechanism.

In another non-limiting example, the host server 150 represents numerous servers hosting, for example, e-mail clients, accessible through e-mail server applications (not shown). In such a non-limiting example, a data item is received on the user computer 120 as, for example, an e-mail attachment, from the host server 150 via the mail server 140 (and the network 110 and typically the gateway 130 as well). As such, the agent 160 of the system 170 is installed as part of the mail server 140, and performs actions which provide the above mentioned mechanism.

The agent 160 includes software, software routines, code, code segments and the like, embodied, for example, in computer components, modules and the like, that are installed on machines, such as the gateway 130 and/or the mail server 140. For example, the agent 160 performs an action when a specified event occurs, as will be further detailed below. The agent 160 may be instructed to perform such actions through received instructions sent from the user computer 120 to the gateway 130 and/or the mail server 140. Alternatively, the agent 160 may be instructed to perform such actions by an administrator (not shown) which may be a computer separate from the user computer 120 linked to the user computer 120 via a private network, such as, for example, an Intranet, or may be linked to the user computer 120 via the network 110.

The system 170, and the agent 160 included therein, preferably operate in cooperation with anti-malware software installed on the user computer 120 such as, for example, Norton anti-virus and McAfee anti-virus.

Figure 2A:
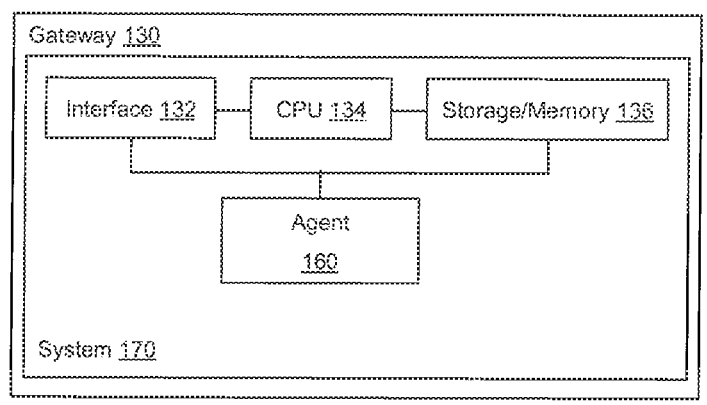
FIGS. 2A and 2B are diagrams of the architecture of exemplary systems embodying the invention.
Figure 2B:
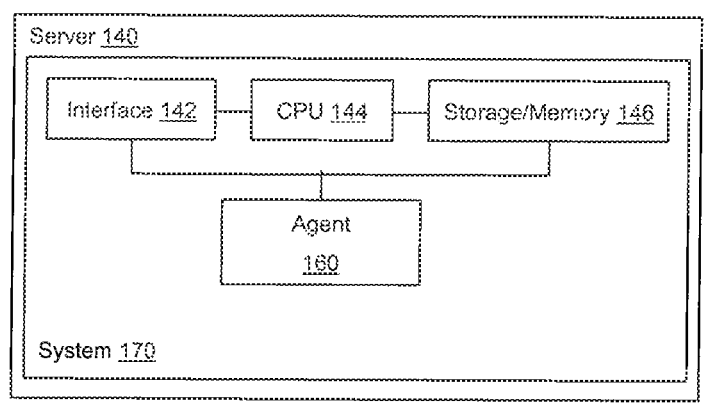

FIG. 2A shows the gateway 130 and the system 170 therein, as an architecture, with the agent 160 incorporated into the system 170 of the gateway 130. Similarly, FIG. 2B shows the mail server 140 and the system 170 therein, as an architecture, with the agent 160 incorporated into the system 170 of the mail server 140. All components of the mail server 140 and/or the system 170 are connected or linked to each other (electronically and/or data), either directly or indirectly. The system 170 is referred to as "the system" in the description of FIG. 3 below.

The gateway 130 includes an interface 132 for exchanging packets with the network 110, a central processing unit (CPU) 134 and a storage/memory 136. The mail server 140 includes an interface 142 for exchanging mail packets with the network 110, a CPU 144 and a storage/memory 146. Each of the processors of the CPU 134 and 144, and each of the storage/memory 136 and 146, although shown as a single component for representative purposes, may be multiple components. Although not shown in the drawings, the gateway 130 and the mail server 140 may each include additional components and/or modules which are typically found in gateways and servers as known in the art, such as, for example, operating systems for managing resources and providing common services for programs run on the gateway 130 and the mail server 140.

Figure 3:
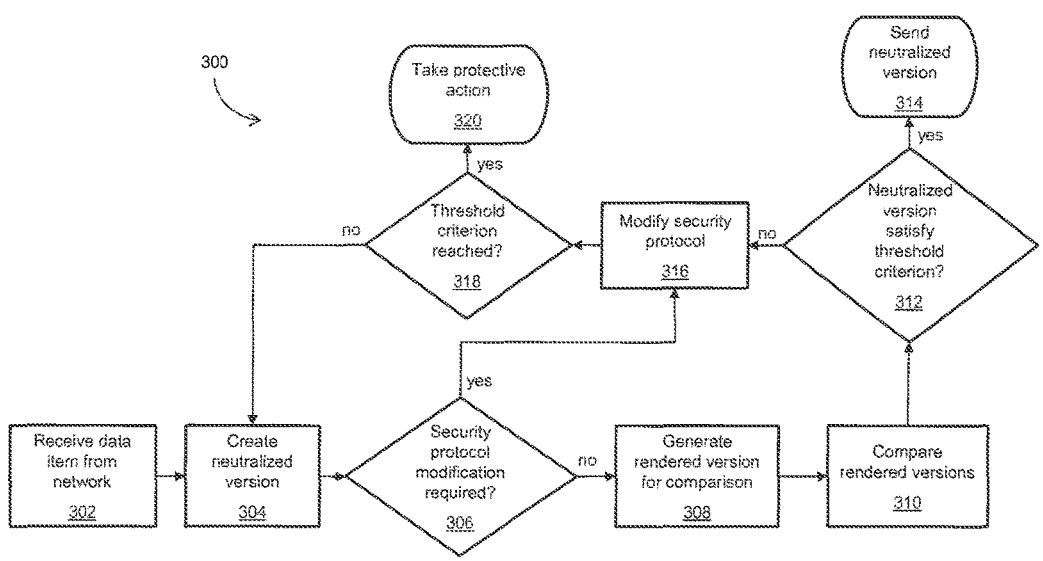
FIG. 3 is a flow diagram illustrating a process for receiving a neutralized data item and for adjusting the security protocol used to create the neutralized data item.

Each of the CPU 134 and 144 is formed of one or more processors, including microprocessors, for performing respective functions of the gateway 130 and mail server 140, including executing the functionalities and operations of the agent 160, as detailed herein, and including the processes shown and described in the flow diagram of FIG. 3. The processors are, for example, conventional processors, such as those used in servers, computers, and other computerized devices. For example, the processors may include x86 Processors from AMD and Intel, Xenon® and Pentium® processors from Intel, as well as any combinations thereof.

Each of the storage/memory 136 and 146 is any conventional storage media. Each of the storage/memory 136 and 146 stores machine executable instructions for execution by the CPU 134 and 144, respectively, to perform the processes of the present embodiments. Each of the storage/memory 136 and 146 also includes machine executable instructions associated with the operation of the components, including the agent 160, and all instructions for executing the processes of FIG. 3, detailed herein.

Figure 2C:
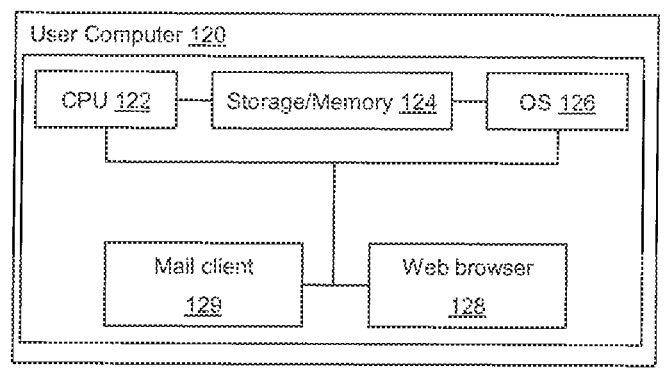
FIG. 2C is a diagram of the architecture of an exemplary endpoint client for which an embodiment of the invention is linked.

FIG. 2C shows a user computer 120, which is linked to the system 170, as an architecture. The user computer 120 includes a CPU 122, a storage/memory 124, an operating system (OS) 126, a web browser 128, and a mail (i.e., e-mail) client 129. The processors of the CPU 122 and the storage/memory 124, although shown as a single component for representative purposes, may be multiple components. The CPU 122 is formed of one or more processors, including microprocessors, for performing the user computer 120 functions, including executing the functionalities and operations of the agent 160 via the gateway 130 and/or the mail server 140, as detailed herein, the OS 126, and including the processes shown and described in the flow diagram of FIG. 3. The processors are, for example, conventional processors, such as those used in servers, computers, and other computerized devices. For example, the processors may include x86 Processors from AMD and Intel, Xenon® and Pentium® processors from Intel, as well as any combinations thereof.

The storage/memory 124 is any conventional storage media. The storage/memory 124 stores machine executable instructions for execution by the CPU 122, to perform the processes of the present embodiments. The storage/memory 124 also includes machine executable instructions associated with the operation of the components, including the agent 160, and all instructions for executing the processes of FIG. 3, detailed herein.

The OS 126 includes any of the conventional computer operating systems, such as those available from Microsoft of Redmond Wash., commercially available as Windows® OS, such as Windows® XP, Windows® 7, MAC OS and iOS from Apple of Cupertino, Calif., or Linux based operating systems such as those available from Google of Menlo Park Calif., commercially available as Android OS.

The web browser 128 is, for example, any web browser used on a computer system for accessing data on the world wide web, such as, for example, Microsoft® Internet Explorer® or Mozilla Firefox®. In the non-limiting example of the receipt of data items via the gateway 130 discussed above, data items may be received (i.e., downloaded) on the user computer 120 from the host server 150 using the web browser 128.

The mail client 129 is, for example, any e-mail client used on a computer system for exchanging e-mail with other computer systems, such as, for example, Microsoft® Outlook, or various web browser based e-mail clients. In the non-limiting example of the receipt of data items via the mail server 140 discussed above, data items may be received on the user computer 120 in the form of files attached to e-mails received from the host server 150 using the mail client 129.

Although the receipt of data items on the user computer 120 has been described thus far through the exemplary illustrations of the web browser 128 (via the gateway 130) and the mail client 129 (via the mail server 140), other data item receipt methodologies and techniques are possible, including, but not limited to, file downloaders, agents, file transfer protocol (FTP), and other network based protocols used for transferring data items between an endpoint client and a server on a computer network. Likewise, the receipt of data items on the network 110 from user computer 120 may also be accommodated by the web browser 128, the mail client 129, or any of the aforementioned mentioned methodologies.

The data items which are intended for receipt on the user computer 120 from the network 110, or intended for upload or transfer to the network 110 from the user computer 120, are referred to hereinafter as "original data items". The original data items may be any file type commonly shared over networks, including, but not limited to, audio file types (e.g., mp3, wav, m4a file types), video file types (e.g., avi, wmv, mp4 files types), and document files such as, for example, those associated with various applications of Microsoft® Office. The original data items may also be non-storable data types, such as, for example, pervasive data items, as discussed above. The original data items intended for receipt on the user computer 120 are made available to the user computer 120, for example, via download from web sites, as file attachments in received e-mails, or any of the above mentioned methodologies.

The agent 160 is, for example, software which runs as a background process on the operating system of the gateway 130 or mail server 140. The agent 160 functions to prevent potential malware and/or ransomware attacks by modifying original data items by, for example, removing objects or components of the original data items, preferably in real-time, as described in detail below, with reference to FIG. 3. The modification of original data items is performed on the packets of the data item while the original data item is in transit between the original data item source and the destination. For example, the packets of the original data item are modified while in transit between the network 110 (i.e., the gateway 130 and/or mail server 140) and the user computer 120.

Note that within the context of this document, the term "destination" generally refers to any computer or device to which communication traffic (i.e., data items) can be propagated from a traffic source or origin, and is not limited solely to the intended ultimate recipient of such traffic. Also note that within the context of this document, the term "source" generally refers to any computer or device from which communication traffic (i.e., data items) can be propagated to a destination, and is not limited solely to the originator of such traffic.

For example, a data packet that is propagated over the network 110 from the user computer 120 to an ultimate recipient client computer connected or linked to the network 110 has multiple destinations, including, for example, the network 110 and its relevant nodes (e.g., gateways, servers, etc.), and the recipient client computer itself. Likewise, a data packet that is propagated over the network 110 from a client computer connected or linked to the network 110 to the user computer 120 has multiple destinations, including, for example, the user computer 120 and the network 110 and its relevant nodes (e.g., gateways, servers, etc.). Likewise, a data packet that is propagated over the network 110 from the user computer 120 to an ultimate recipient client computer connected or linked to the network 110 has multiple sources, including, for example, the user computer 120 and the network 110 and its relevant nodes (e.g., gateways, servers, etc.). Likewise, a data packet that is propagated over the network 110 from a client computer connected or linked to the network 110 to the user computer 120 has multiple sources, including, for example, the client computer and the network 110 and its relevant nodes (e.g., gateways, servers, etc.).

Accordingly, the destinations and sources of communication traffic (i.e., data items) are all considered as entities of a network involved in the propagation and transferring of data items over the network 110. In the context of the non-limiting examples above, such entities include, for example, the user computer 120, the recipient client computer, the traffic source client computer, and the network 110 and its relevant nodes (e.g., gateways, servers, etc.).

The agent 160 preferably operates on such aforementioned original data items prior to an original data item being accessed by processes executed on the user computer 120, such as, for example processes executed by the OS 122 or processes that are instances/executions of payload applications, such as, for example, Microsoft® Office applications and Adobe® PDF Reader®. In certain instances, the agent 160 operates on such aforementioned original data items prior to receipt of the original data items on the user computer 120, such as, for example, in a permanent or temporary memory of the user computer 120, such as the storage/memory 124. In this way, the OS 122 is prevented from performing any actions which might cause a malicious component embedded in an original data item from being deployed on the user computer 120, which could otherwise result in a malware or ransomware infection on the user computer 120.

In an exemplary series of processes to receive neutralized data items, and to adjust the security protocol used to create the neutralized data items, the system 170 first creates neutralized versions of original data items. The original data items are decomposed, based on a security protocol that applies rules and policies, to remove any malicious or potentially malicious components, and then subsequently reconstructed to create the neutralized versions of the of the original data items. The terms "neutralized version" and "neutralized version of an original data item" are used interchangeably herein.

The system 170 then creates (i.e., generates) a comparable version, or form, of the neutralized versions of a data item, and a comparable version, or form, of the corresponding original data item. The system 170 subsequently compares the comparable versions of the data items in order to evaluate a comparison measure, such as, for example, the fidelity, quality, or other parameter of the neutralized version of the data item. As a consequence of the reconstruction, the fidelity or quality of the neutralized version of a received data item may be degraded or compromised, rendering the neutralized version of the data item unintelligible, or less intelligible than the original data item, to a user of the user computer 120. If the neutralized version of the data item is of sufficient fidelity or quality, the system 170 propagates the neutralized version of the data item to the destination (i.e., the user computer 120 or the network 110), via the gateway 130 or mail server 140, depending on the traffic path of the original data item. If the neutralized version of the data item is of insufficient quality or fidelity, the system 170 modifies (i.e., changes or adjusts) the security protocol to create a new neutralized version of the original data item. The system 170 then generates a comparable version or form of the new neutralized version of the original data item, and a new comparison is made to the comparable version of the original data item.

The system 170 repeats the above process until a criterion is satisfied. For example, the criterion may be that a neutralized version of the data item is created that is of sufficient fidelity or quality, after which such a neutralized version is propagated by the system 170, via the gateway 130 or mail server 140, to the destination. Alternatively, the criterion may be a maximum number of the aforementioned repetitions (i.e., iterations) based on, for example, the amount of resources consumed by the CPU 134 and/or 144 or the amount of disk space occupied in the storage/memory 136 and/or 146. In cases where such a maximum number of iterations is reached, the system 170 will prevent the gateway 130 or mail server 140 from propagating any neutralized versions of the data item to or from the endpoint client (e.g., the user computer 120), and the agent 160 may initiate (by signaling) the taking of protective action by the endpoint client, to take protective actions. For example, protective actions may include remediation actions such as: 1) quarantining the original data item; 2) displaying a message, warning window, or the like, on the user computer 120; 3) alerting or notifying a system administrator about the security incident; 4) suspending the administrative account of the user computer 120, for example, by locking the user computer 120; and 5) quarantining the user computer 120 by blocking the user computer 120 from accessing the network 110, or otherwise disconnecting the user computer 120 from the network, or disabling the user computer 120.

The system 170 performs, for example, additional functions, such as monitoring the amount of resources consumed by the CPU 134 and/or 144 or the amount of disk space occupied in the storage/memory 136 and/or 146 during the generation of the neutralized version of data items in order to preemptively modify security protocols used to create the neutralized versions if a threshold criterion is satisfied. For example, if amount of resources or disk space is above a threshold value, which is preferably a dynamic threshold value to account for fluctuation activity (i.e., traffic) occurring on the gateway 130 or mail server 140, the system 170 may interrupt the generation of the neutralized version and modify the security protocol to create a new neutralized version of the original data item.

The above mentioned exemplary processes allows a user of the user computer 120 to receive modified versions of data items that may otherwise be deemed as suspicious, malicious, or potentially malicious, and potentially quarantined, by typical anti-virus or anti-malware programs. This may be exemplified by scenarios, for example, in which a user of the user computer 120 receives an e-mail communication (via the mail client 129) from a sender, known or unknown to the user, which includes a file attachment that may include information that is potentially relevant to the user. For example, the e-mail communication may be an e-mail from a friend, relative, colleague, employer, or teacher. In typical situations, the security status of the computer of the sender is unknown to the user of the user computer 120, and as such, the user of the user computer 120 may otherwise be hesitant to open the file attachment (i.e., allow access to the file attachment by processes, such as OS 126 processes, executed on the user computer 120). Alternative scenarios may include, for example, a user of the user computer 120 attempting to download a user viewable file (e.g., a word processing file) from a web site (via the web browser 128) of unknown or risky security status. As such, the user of the user computer 120 may otherwise be hesitant to download files from such web sites, which would allow access to the downloaded file by processes, such as OS 126 processes, executed on the user computer 120. Accordingly, by performing such exemplary processes, the user of the user computer 120 is able to view versions (i.e., a neutralized versions) of the above discussed file attachments or downloadable files, without exposing the user computer 120 to potential malware or ransomware infections.

The aforementioned exemplary processes also prevent a user of the user computer 120 from knowingly or unknowingly transmitting restricted information embedded in data items over the network 110.

Figure 2D:
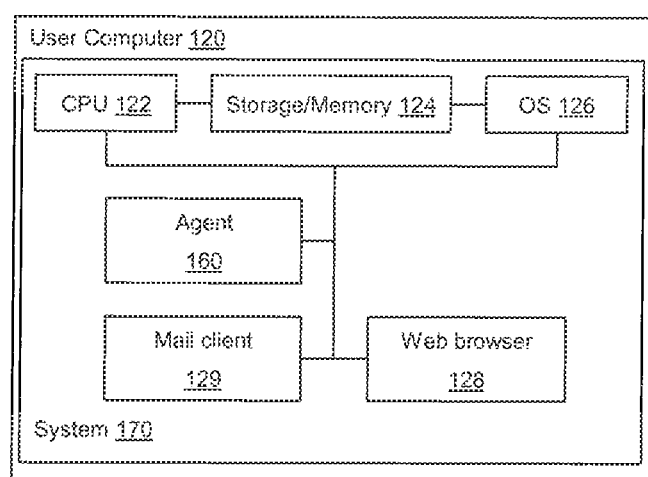
FIG. 2D is a diagram of the architecture of an exemplary system embodying the invention installed on an endpoint client.

Although the embodiments described thus far have pertained to the system 170, and the agent 160 therein, installed on a gateway (i.e., the gateway 130) and/or a server (e.g., the mail server 140), other embodiments are possible in which the system 170 is installed on the user computer 120, as shown in FIG. 2D, or another computer or module linked to the gateway and the mail server. In such embodiments, the exemplary series of processes executed by the system 170 may be distributed across various entities, such that the user computer 120 and the server 140 each execute specific tasks and/or process steps. For example, the modification of original data items and the generation of comparable forms may be performed by the server 140, and the evaluation of the comparison measure may be performed by the user computer 120 itself. In such embodiments, the server 140 may be a remote server, such as, for example, a cloud server, that operates independently from any system administrator.

For clarity of illustration, the remaining portions of the disclosure of the embodiments of the system 170, and the methodology of the functions performed thereby, are described with respect to the deployment of the system 170 on a gateway (i.e., the gateway 130) and/or a mail server (i.e., the mail server 140). Such description should not be taken to limit the deployment of the system 170 exclusively on a gateway and/or mail server.

Attention is now directed to FIG. 3 which shows a flow diagram detailing a computer-implemented process 300 in accordance with embodiments of the disclosed subject matter. This computer-implemented process includes an algorithm for receiving neutralized data items and for adjusting the security protocol, when necessary, used to create the neutralized data items. The neutralized data items are received on the user computer 120 from the network 110 and/or on the network 110 from the user computer 120. Reference is also made to the elements shown in FIGS. 1-2D. The process and sub-processes of FIG. 3 are computerized processes performed by the system 170 including, for example, the CPU 134 or the CPU 144 and associated components, such as the agent 160, at the gateway 130 or the mail server 140, respectively. The aforementioned processes and sub-processes are for example, performed automatically, but can be, for example, performed manually, and are performed, for example, in real-time.

The process 300 begins at block 302, where a data item (i.e., an original data item) is received by the system 170. Exemplary executions of block 302 generally includes two scenarios (a first scenario and a second scenario). The first scenario occurs when an original data item is received over the network 110, and more specifically, from the network 110, which without the gateway 130 or the mail server 140 of the embodiments of the present disclosure, may otherwise be received on the user computer 120. As discussed above, the original data item may be, for example, a file downloaded from a website by the user computer 120, a file attached to an e-mail received on the user computer 120 via the mail client 129, or via another data item transfer methodology as discussed above. The second scenario occurs when an original data item is received over the network 110, and more specifically, from the user computer 120, which without the gateway 130 or the mail server 140 of the embodiments of the present disclosure, may otherwise be received on computers or devices connected or linked to the network 110.

The process 300 then moves to block 304, where the system 170 begins creating a neutralized version of the original data item. The neutralized version is created by applying a security protocol to the original data item. The security protocol is selected from a list of various security protocols which can be applied to such data items. The list of security protocols may be predetermined by a party, such as, for example, by an administrator. The selected security protocol is configured to apply rules and policies to original data items in order to neutralize possible threats embedded in the original data items. As a result of the neutralization of the original data items, the neutralized versions of data items do not include components which pose potential security threats or risks to the user computer 120, and do not include restricted information embedded in the data items. The neutralized version preferably maintains as much of the embedded information in the original data item as possible. As previously discussed, the security protocol is applied to the packets of the original data item while in transit between the network 110 (i.e., the gateway 130 and/or mail server 140) and the user computer 120.

During the process of creating the neutralized version in block 304, the original data item may be converted into a different file type, using file conversion techniques as known in the art. As such, the target file type of the neutralized version preferably supports several of the key features and data structures of the original data item, so as to maintain as much of the information embedded in the original data item as possible.

The selected security protocol may be configured to apply rules and policies which remove components or objects of the original data item which are identified by the system 170 as suspicious, malicious, or potentially malicious. Types of such components include, but are not limited to, components that match or partially match a malware signature as defined in a malware signature database included as part of, or coupled to, the system 170, and macros in word processing files and spreadsheet files, such as, for example, the word processing document file format used with Microsoft® Word (i.e., *.doc), the extensible markup language (XML) document file format used with Microsoft® Word (i.e., *.docx), the spreadsheet file format used with Microsoft® Excel (i.e., *.xls), and the XML spreadsheet file format used with Microsoft® Excel (i.e., *.xlsx).

The selected security protocol may also be configured to apply rules and policies which remove components or objects of the original data item which are identified by the system 170 as containing restricted information. Such restricted information may be contained in the original data item via techniques, such as, for example, embedding the restricted information in hidden components of the original data item, embedding the restricted information in an image associated with the original data item (which may be an image file itself), and other similar techniques.

Accordingly, the system 170 is preferably configured to perform functions for identifying the aforementioned suspicious, malicious, potentially malicious, or restricted components of original data items. For example, the system 170 performs analyses on an original data item to identify which, if any, components or sub-components of the original data item are suspicious, malicious, potentially malicious, or restricted. The analyses may be performed according to methods and techniques known in the art, such as, for example, hashing techniques and heuristic techniques and methods. As a result of such analyses, the original data item may be decomposed or deconstructed into multiple components and sub-components. If any such components and sub-components are identified by the agent 160 as suspicious, malicious, potentially malicious, or restricted, the identified components and sub-components are flagged and removed from the original data item, and the neutralized version of the data item is created (i.e., generated) by combining, for example in accordance with the structure of the original data item, the remaining non-malicious, non-suspicious, non-potentially malicious, and non-restricted components and sub-components.

Note that the system 170 may be configured to perform the above described analyses by first decomposing or deconstructing the original data item into multiple components and sub-components. The system 170 may then subsequently perform analyses, according to the above mentioned methods and techniques, to identify which, if any, of the components and sub-components are suspicious, malicious, potentially malicious, or restricted.

The neutralized version of an original data item may also be created by the system 170 by adding to or offsetting data components of the original data item. For example, in instances in which the original data item is a media file, such as, for example, an audio or video file, randomized noise, in the form of random or pseudorandom numbers, may be added to file. As a result, any components previously containing suspicious sub-components are altered in a way which neutralizes such components. The addition of such noise may be accomplished in various ways, such as, for example, by first normalizing the data contained in the file, and subsequently modifying characteristics of the file. Such characteristics include, but are not limited to, audio level, pitch level, white balance, and other media file encoding characteristics. Randomized noise may also be similarly added to image files.

For certain types of image and audio files, such as, for example, specific types of JPEG files, TIFF files, and specific types of WAV files, neutralization may be implemented by adjusting the information that is included in the tag structure of such files. Such tag structure may be presented by the Exchangeable image file format (Exif). As such, adjustment of the Exif information according to a standardized rule set provides a means for removing content from (or allowing content in) such image and audio file types.

The neutralized version created in block 304 may be of any appropriate file type that satisfies the security constraints (i.e., rules and policies) imposed by the selected security protocol. In certain non-limiting implementations, as a result of the execution of block 304, the original data item is converted into a non-editable file, such as, for example, a PDF file. For example, if the original data item is a *.doc or *.docx file type, the execution of block 304 results in the original files being converted from the source *.doc or *.docx file type into a *.pdf file type.

As should be understood from the above discussion, the neutralized version, and more specifically the characteristics and/or attributes of the neutralized version, is a direct function of the security protocol used to create the neutralized version. In other words, different security protocols used to create respective neutralized versions of the same original data item will, in many instances, result in neutralized versions having different characteristics and/or attributes.

Subsequent, or in parallel, to block 304, the process moves to block 306, where the system 170 makes a determination, based on the neutralized version of the original data item that was created in block 304, or is concurrently being created in block 304, whether the security protocol selected for generating the neutralized version requires modification. The determination in block 306 is made based on an evaluation of a parameter (or parameters) against respective threshold criterion. Examples of parameters used in the determination in block 306, include, but are not limited to, the amount of resources consumed by the CPU 134 and/or 144 (depending on whether the system 170 is deployed as part of the gateway 130 or the mail server 140) in generating the neutralized version, the absolute amount of disk space in a memory (e.g., the storage/memory 136 and/or 146) consumed by the neutralized version, the ratio or difference between the amount of disk space in a memory (e.g., the storage/memory 136 and/or 146) consumed by the neutralized version and the original data item, the amount of time required to create the neutralized version, the number of processing cycles required to create the neutralized version, and the fidelity (i.e., quality) of the neutralized version.

As mentioned above, each of the aforementioned parameters is evaluated against a respective threshold criterion. The corresponding threshold criterion for each parameter may be a dynamic threshold value which fluctuates based on the changing conditions, such as traffic conditions, of the deployed system 170. For example, the corresponding threshold values for the amount of resources consumed by the CPU 134 and 144 can be dynamically adjusted based on the current resource consumption by the CPU 134 and 144 due to other processes executed on the gateway 130 or mail server 140, respectively. Similarly, the corresponding threshold values for the absolute or relative disk space consumed by the neutralized version can also be dynamically adjusted based on the current disk space available in memory (e.g., the storage/memory 136 and/or 146).

Alternatively, the corresponding threshold criterion for each parameter may be a static threshold value set by, for example, an administrator. For example, the corresponding threshold value for the amount of time required to create the neutralized version may be predetermined and statically programmed into a memory of the system 170 (e.g., the storage/memory 136 and/or 146) by the administrator, to ensure that the user of the user computer 120 maintains reasonable connectivity and is not subjected to unnecessarily protracted delays in receipt of data items.

Note that the number of processing cycles of the CPU 134 and/or 144 required to create the neutralized version is directly related to the amount of time required to create the neutralized version. As such, the threshold value for the number of such processing cycles may be derived from the threshold value for the amount of time required to create the neutralized version, and vice versa.

As mentioned above, in block 306 the system 170 makes a determination, whether the security protocol selected for generating the neutralized version requires modification. If the security protocol requires modification, based on the determination made in block 306, the process 300 moves to block 316, where the security protocol is modified by the system 170. The modification of the security protocol in block 316 entails, for example, selecting a new security protocol from the list of various security protocols which can be applied to original data items.

In an illustrative example, the parameter evaluated in block 306 is the time required to create the neutralized version, and the threshold value for the amount of time required to create the neutralized version is set to 2 milliseconds. The execution time for performing block 304 may be tracked by a clock (not shown) of the system 170, which may be coupled to the CPU 134 and/or 144. As such, if the system 170 takes more than 2 milliseconds to create the neutralized version, the neutralized version generation process of block 304 is interrupted and the determination is made that the security protocol used to create the neutralized version requires modification. In other words, if more than 2 milliseconds elapse from the start of the execution of block 304, as tracked by the clock, the execution of block 304 is interrupted and the process 300 moves to block 316.

If the security protocol does not require modification, based on the determination made in block 306, the process 300 moves to block 308, where each of the original data item and the neutralized version of the original data item are rendered (i.e., converted) into a comparable form for comparison by the system 170. The generation (i.e., creation) of the rendered versions in block 308 is executed in order to evaluate a comparison measure or parameter of the neutralized version of the original data item. The system 170 performs the rendering (i.e., conversion) of each of the original data item and the neutralized version into a comparable form using any file conversion technique, as are known in the art.

In a non-limiting exemplary implementation, when the original data item is a non-video or non-audio file type, each of the original data item and the neutralized version of the original data item are converted into respective image files, such as, for example, JPEG, GIF, PNG, and BMP images. When the original data item is an audio or video file type, each of the original data item and the neutralized version may be maintained in the original data item file format, or in a compressed form, via data compression techniques.

Note that the original data item may be rendered in block 308 immediately upon receipt of the original data item from (or on) the network 110 in block 302. As such, while the system 170 performs the tasks associated with blocks 304 and 306, the original data item may already be converted into an appropriate comparable form. Accordingly, if upon making the determination in block 306 that the security protocol does not require modification, only the neutralized version may be rendered (i.e., converted) into the appropriate comparable form in block 308.

It is noted that any file conversion process, as carried out in blocks 304 or 308, preferably does not result in an increase of information (i.e., an increase in file entropy). For example, if as a result of the execution of block 304 a word processing file (e.g., an original data item of *.doc or *.docx file type) is converted to a PDF file (i.e., the neutralized version), the amount of information in the PDF file (i.e., the entropy of the PDF file) is less than or equal to the amount of information in the word processing file (i.e., the entropy of the word processing file). Furthermore, if as a result of the execution of block 308 the word processing file is converted to a first JPEG file (i.e., the comparable form of the original data item) and the PDF file is converted to a second JPEG file (i.e., the comparable form of the neutralized version), the amount of information in the first JPEG file (i.e., the entropy of the first JPEG file) is less than or equal to the amount of information in the word processing file (i.e., the entropy of the word processing file), in the PDF file (i.e., the entropy of the PDF file) and the amount of information in the second JPEG file (i.e., the entropy of the second JPEG file) is less than or equal to the amount of information.

From block 308, the process 300 moves to block 310, where the rendered versions (i.e., the converted versions) of the neutralized version and the original data item are compared by the system 170, for example, using a comparison engine of the agent 160. As a result of the comparison executed in block 310, the aforementioned comparison measure is output, for example, from the comparison engine. It is noted that multiple comparison methods may be used in parallel to form multiple comparison measures formed in block 310. The comparison methods used may also depend on the file type of the original data item, the file type of the neutralized version, the file types of the comparable forms, or a combination thereof. It is also noted that the multiple comparison measures may be combined or aggregated to form a single comparison measure.

Examples of comparison measures include, but are not limited to, the fidelity or quality of the neutralized version, the amount of resources consumed by the CPU 134 and/or 144 (depending on whether the system 170 is deployed as part of the gateway 130 or the mail server 140) in generating the neutralized version or the converted (i.e., rendered) versions of the original data item or the neutralized version, the absolute amount of disk space in a memory (e.g., the storage/memory 136 and/or 146) consumed by the neutralized version or the converted (i.e., rendered) versions of the original data item or the neutralized version, the ratio (i.e., relative) between the amount of disk space in a memory (e.g., the storage/memory 136 and/or 146) consumed by the neutralized version and the original data item, the amount of time required to create the neutralized version or the converted (i.e., rendered) versions of the original data item or the neutralized version, and the number of processing cycles required to create the neutralized version or the converted (i.e., rendered) versions of the original data item or the neutralized version.

As discussed in the non-limiting exemplary implementation for non-video and non-audio file types mentioned above, each of the original data item and the neutralized version of the original data item are converted into respective image files, such as, for example, JPEG, GIF, PNG, and BMP images. In such an implementation, the comparison measure, resultant from block 310, for evaluating the fidelity or quality of the neutralized version may be formed by performing operations, such as those found in, for example, image processing techniques, on subsets of the image pixels. For example, each pixel of the converted neutralized version may be compared qualitatively to a respective pixel, in a corresponding location, of the converted original data item. In other words, the pixel in the $i^{th}$ row and $j^{th}$ column of the converted neutralized version may be compared to the pixel in the $i^{th}$ row and $j^{th}$ column of the converted original data item.

Such pixel comparisons may be executed, for example, by performing an exclusive or (XOR) operation on the bit value of pairs of corresponding pixels to identify pixels of the converted neutralized version that differ from the converted original data item. Ideally, the result of the XOR operation results in an output of zeros (i.e., a zero for each bit in the pixel value) which implies that the two compared pixels have identical bit values. If the XOR operation results in non-zero output, the number of non-zeros in the XOR output, as well as the locations of the non-zeros, may be used to identify components of the neutralized version which differ from the original data item, which can be used to generate the comparison measure for fidelity evaluation. Alternatively, correlations, or statistical measures, between the pairs of pixel values may be formed and used to generate the comparison measure for fidelity evaluation.

Additional comparison techniques may be implemented which incorporate the relative positioning of pixels, which may aid in accounting for translation and/or shifting of image components during the conversion process executed in block 308. For example, a pixel, or group of pixels, of the converted neutralized version, may be compared to a group of pixels, in a corresponding region, of the converted original data item. For example, the corresponding region may include the location corresponding pixel in the converted original data item and all neighboring pixels. As an illustrative example, the pixel in the $4^{th}$ row and $10^{th}$ column of the converted neutralized version may be compared with the nine pixels occupying the $3^{rd}$ through $5^{th}$ rows and $9^{th}$ through $11^{th}$ columns of converted original data item. Similar to as described above, the comparison may be executed by performing a pairwise XOR operation between the pixel of the converted neutralized version and each pixel in the defined corresponding region of the converted original data item. A weighted average, or other statistical operations, may be performed to aggregate the XOR outputs for each converted neutralized version and used to generate the comparison measure for fidelity evaluation. Alternatively, pairwise correlations may be formed between the pixel of the converted neutralized version and each pixel in the defined corresponding region of the converted original data item. A weighted average, or other statistical operations, may be performed to aggregate the pairwise correlations and used to generate the comparison measure for fidelity evaluation.

In a non-limiting illustrative example, an original data item is a *.doc or *.docx file type that includes graphics and portions of text positioned relative to the graphics, and the comparable forms generated in block 308 are respective JPEG files. In addition to the pixel bit value XOR operation mentioned above, the system 170 may determine whether the threshold criterion is satisfied, based on for example, the number of pixels corresponding to portions of text in the comparable form of the neutralized version properly positioned relative to the pixels corresponding to the appropriate graphics of the same comparable form.

For original data items which are media files, such as, for example, audio file types and video file types, signal processing techniques, including, but not limited to, convolutions, correlations, frequency component analysis, Fourier analysis, and sampling rate analysis, may be used to evaluate the fidelity or quality of the neutralized versions. Such techniques can be used to determine the similarity or difference between two such media files based on the signal characteristics of the media files.

The process 300 moves to block 312, where the system 170 makes a determination, based on the comparison measure (or measures) output from block 310, whether the neutralized version can be sent to the destination (i.e., to the user computer 120 from the network 110, or to the network 110 from the user computer 120). The determination in block 312 is made based on an evaluation of the comparison measure (or measures) against a threshold criterion (or multiple criteria), similarly to as described with reference to block 306 above. Typically, the threshold criterion in block 312 is a threshold value set by the administrator.

If the comparison measure, as evaluated against the appropriate threshold criterion, yields that the neutralized version can be sent to the destination, the process 300 moves to block 314, where the system 170 sends the neutralized version to the destination, and subsequently the process 300 ends. As a result, for data items received on the user computer 120 from the network 110, the neutralized version can be accessed by processes executed on the user computer 120, and ultimately, accessed and viewed by a user of the user computer 120. Accordingly, the execution of block 314 allows for a user of the user computer 120 to receive variations of data items that may otherwise be deemed as suspicious, malicious, or potentially malicious, and potentially quarantined, by typical anti-virus or anti-malware programs. The process 300 may then begin again when a new data item is received by the system 170.

Note that the user of the user computer 120 may choose to allow access to the original data item by processes, such as OS 126 processes executed on the user computer 120, at the discretion of the user of the user computer 120. In other words, upon receiving a neutralized version of the original data item from the network 110, the user of the user computer 120 may choose to open the original data item regardless of any potential security risk posed to the user computer 120 by the original data item.

If the comparison measure, as evaluated against the appropriate threshold criterion, does not yield that the neutralized version can be sent to the destination, the process 300 moves to block 316, where the security protocol is modified. For example, the process 300 moves to block 316 if the comparison as executed in block 310 results in a comparison measure that indicates that the neutralized version is too distorted, based on, for example, the fidelity of the neutralized version, for reasonable comprehension by the user of the user computer 120.

As mentioned above, in block 316 the security protocol is modified by the system 170. The modification of the security protocol, as executed in block 316, allows the system 170 to iteratively adjust the fidelity or quality of the neutralized version until a determination is made that a neutralized version can be sent to the destination or that the original data item cannot be converted into a neutralized version that is of sufficient fidelity or quality for receipt by the user computer 120 within a threshold limit. The iterative nature of the process 300 is exemplified by the execution of block 318. Accordingly, in block 318 the system 170 makes such a determination by evaluating a parameter, such as, for example, the number of iterations of the process 300 against a threshold criterion. Typically, the threshold criterion in block 318 is a threshold value set by the administrator, which can be, for example, a static threshold value for the number of iterations allowed by the system 170 before determining that the original data item cannot be converted into a neutralized version that is of sufficient fidelity or quality for receipt by, for example, the user computer 120. As an illustrative example, the threshold value for the number of iterations may be set to 3 iterations.

Alternatively, the threshold value can be a dynamic threshold value that is a function of the operating conditions of the environment in which the system 170 is deployed (e.g., the gateway 130 or mail server 140). For example, if the gateway 130 (or mail server 140) is limited in resources, due to factors such as processes running which require an increased amount of CPU resources or memory and/or disk space limitations, the threshold value for the number of iterations may be decreased, for example, to 1 or 2 iterations. Conversely, if the gateway 130 (or mail server 140) is not overly limited in resources, due to factors such as processes running which require few CPU resources, the threshold value for the number of iterations may be increased to, for example, 3 or more iterations.

In order to track the number of iterations of the process 300, the system 170 initiates an iteration counter at block 302, and increases the iteration count each time block 318 is executed. Note that parameter evaluated in block 318 may alternatively be a time parameter which counts the elapsed time from the execution of block 302 (i.e., from the start of the process 300). The elapsed time may be tracked by a clock (not shown) of the system 170, which may be coupled to the CPU 134 and/or 144.

As should be apparent, the number of iterations completed when executing the process 300 for each data item to be received at the destination (i.e., to the user computer 120 from the network 110, or to the network 110 from the user computer 120) may fluctuate in real-time, due to the resource consumption and other such factors as mentioned above.

If, as determined by block 318, the original data item cannot be converted into a neutralized version that is of sufficient fidelity or quality for receipt by, for example, the user computer 120 within the threshold limitations (i.e., if the process 300 reaches an iteration or time threshold), the process 300 moves to block 320, where the agent 160 will initiate (by signaling) the taking of protective action by the endpoint client, to take protective action, and subsequently the process 300 ends. This protective action includes, for example, one or more of: 1) quarantining the original data item; 2) displaying a message, warning window, or the like, on the user computer 120; 3) alerting or notifying a system administrator about the security incident; 4) suspending the administrative account of the user computer 120, for example, by locking the user computer 120; and 5) quarantining the user computer 120 by blocking the user computer 120 from accessing the network 110, or otherwise disconnecting the user computer 120 from the network, or disabling the user computer 120. The process 300 may then begin again when a new data item is received by the system 170.

If, as determined by block 318, the fidelity or quality of the neutralized version can be adjusted (i.e., if the process 300 has not reached the iteration or time threshold), the process 300 returns to block 304 where a new neutralized version is created according to the rules and policies of the security protocol modified in block 316. The modification of the security protocol in block 316 for generating the new neutralized version in block 304 results in the new neutralized version having increased fidelity or quality as compared with previous neutralized versions created in previous iterations of the process 300. For example, the new security protocol (i.e., modified security protocol) used to create the new neutralized version may be configured to remove fewer components or objects of the original data file which are identified by the system 170 as suspicious, malicious, potentially malicious, or restricted, as compared with the previously used security protocol used in previous iterations of the process 300. The configuration to remove fewer such components or objects may be implemented by adjusting the rules and policies of a selected security protocol thereby reducing the sensitivity of the security protocol. As a result, for example, of applying such a modified security protocol to an original data item, the neutralized version created in block 304 may have fewer components identified by the system 170 as suspicious, malicious, potentially malicious, or restricted, as compared with the previously used security protocol used in previous iterations of the process 300.

As should be understood from the above description, the process 300 may continue, iteratively, for each data item received, either from the network 110 or from the user computer 120, until an exit criterion is reached. The exit criterion is represented by the comparison measure (or measures) from block 310 satisfying the threshold criterion of block 312, and by satisfying the threshold criterion (i.e., the iteration or elapsed time counter) of block 318. Once either of the threshold criterion of block 312 or 318 are satisfied, the system 170 performs the respective actions in blocks 314 and 320, and subsequently the process ends 300.

Note that as a byproduct of such iterative adjustment of security protocols with varying rules and policies, neutralized versions created at each iteration may fluctuate in the level of security, possibly becoming less secure (i.e., a smaller level of neutralization) than previous neutralized versions created in previous iterations of the process 300.

Also note that the execution of blocks 316 and 318 may be performed in an order different from the order noted in FIG. 3. For example, the evaluation of the parameter (e.g., iterations, time, etc.) against the threshold criterion as performed in block 318 may be performed subsequent to the execution of blocks 306 and/or 312. As such, if the process 300 has not reached the threshold parameter, as determined by the execution of block 318, the process 300 may move to block 316 and subsequently to block 304.

As previously mentioned, the exemplary series of processes executed by the system 170 may be distributed across various entities, such that the user computer 120 and the server 140 each execute specific tasks and/or process steps. As such, and in accordance with the previously discussed examples and the blocks (i.e., steps) of the process 300 described above, blocks 304 and 308 (and any intervening blocks) may be performed by the server 140, which may be a remote server, such as, for example, a cloud server, and blocks 310 and 312 may be performed by the endpoint client (e.g., the user computer 120). Other distributions of the performance and/or execution of tasks of the process 300 are possible, as should be understood to one of ordinary skill in the art.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, non-transitory storage media such as a magnetic hard-disk and/or removable media, for storing instructions and/or data. Optionally, a network connection is provided as well. A display and/or a user input device such as a keyboard or mouse are optionally provided as well.

For example, any combination of one or more non-transitory computer readable (storage) medium(s) may be utilized in accordance with the above-listed embodiments of the present invention. The non-transitory computer readable (storage) medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

As will be understood with reference to the paragraphs and the referenced drawings, provided above, various embodiments of computer-implemented methods are provided herein, some of which can be performed by various embodiments of apparatuses and systems described herein and some of which can be performed according to instructions stored in non-transitory computer-readable storage media described herein. Still, some embodiments of computer-implemented methods provided herein can be performed by other apparatuses or systems and can be performed according to instructions stored in computer-readable storage media other than that described herein, as will become apparent to those having skill in the art with reference to the embodiments described herein. Any reference to systems and computer-readable storage media with respect to the following computer-implemented methods is provided for explanatory purposes, and is not intended to limit any of such systems and any of such non-transitory computer-readable storage media with regard to embodiments of computer-implemented methods described above. Likewise, any reference to the following computer-implemented methods with respect to systems and computer-readable storage media is provided for explanatory purposes, and is not intended to limit any of such computer-implemented methods disclosed herein.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein, the singular form "a", "an" and "the" include plural references unless the context clearly dictates otherwise.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

The above-described processes including portions thereof can be performed by software, hardware and combinations thereof. These processes and portions thereof can be performed by computers, computer-type devices, workstations, processors, micro-processors, other electronic searching tools and memory and other non-transitory storage-type devices associated therewith. The processes and portions thereof can also be embodied in programmable non-transitory storage media, for example, compact discs (CDs) or other discs including magnetic, optical, etc., readable by a machine or the like, or other computer usable storage media, including magnetic, optical, or semiconductor storage, or other source of electronic signals.

The processes (methods) and systems, including components thereof, herein have been described with exemplary reference to specific hardware and software. The processes (methods) have been described as exemplary, whereby specific steps and their order can be omitted and/or changed by persons of ordinary skill in the art to reduce these embodiments to practice without undue experimentation. The processes (methods) and systems have been described in a manner sufficient to enable persons of ordinary skill in the art to readily adapt other hardware and software as may be needed to reduce any of the embodiments to practice without undue experimentation and using conventional techniques.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A method for receiving data items on a first computerized entity from a second computerized entity over a network, comprising the steps of:
   receiving a first data item from the second computerized entity;
   applying a security protocol, that applies rules and policies, to the first data item to create a second data item, wherein each of the first and second data items has an associated fidelity, and wherein the second data item is of lower fidelity than the first data item;
   analyzing the second data item against the first data item by comparing a rendered version of the second data item with a rendered version of the first data item to form at least one comparison measure of the second data item;
   evaluating the at least one comparison measure against a threshold criterion; and
   if the at least one comparison measure dissatisfies the threshold criterion:
      modifying the security protocol to adjust the fidelity of the second data item, and
      repeating the applying, analyzing, and evaluating steps; and
      applying the modified security protocol to the first data item.

2. The method of claim 1, further comprising the step of: receiving the second data item on the first computerized entity if the at least one comparison measure satisfies the threshold criterion.

3. The method of claim 1, further comprising the step of: taking at least one protective action if at least one comparison measure associated with a number of iterations satisfies a threshold criterion.

4. The method of claim 1, further comprising the step of: generating the rendered version of the second data item and the rendered version of the first data item by converting each of the respective data items into a comparable form.

5. The method of claim 1, wherein the applying step includes identifying potentially malicious or restricted components of the first data item.

6. The method of claim 5, wherein the applying step further includes removing the components of the first data item identified as potentially malicious or restricted.

7. The method of claim 1, wherein the first computerized entity includes at least one of an endpoint or the network.

8. The method of claim 1, wherein the second computerized entity includes at least one of an endpoint or the network.

9. The method of claim 1, wherein the applying step includes: decomposing the first data item into a plurality of components, and combining at least a subset of the plurality of components.

10. The method of claim 1, wherein the second data item is a neutralized version of the first data item.

11. The method of claim 1, wherein the at least one comparison measure includes at least one of: the fidelity of the second data item, an absolute amount of disk space consumed by the second data item, a ratio between the amount of disk space consumed by the second data item and the first data item, an amount of time taken to perform the generating of the second data item, an amount of resources consumed by the generating of the second data item, an amount of time taken to perform the analyzing the second data item against the first data item, and an amount of resources consumed by the analyzing the second data item against the first data item.

12. A computer system for sending data items from a first computerized entity to a second computerized entity over a network, comprising:
- a storage medium for storing computer components; and
- a computerized processor for executing the computer components comprising:
  - a computer module configured for performing the steps of:
    - receiving a first data item from the first computerized entity;
    - applying a security protocol, that applies rules and policies, to the first data item to create a second data item, wherein each of the first and second data items has an associated fidelity, and wherein the second data item is of lower fidelity than the first data item;
    - analyzing the second data item against the first data item by comparing a rendered version of the second data item with a rendered version of the first data item to form at least one comparison measure of the second data item;
    - evaluating the at least one comparison measure against a threshold criterion; and
    - if the at least one comparison measure dissatisfies the threshold criterion:
      - modifying the security protocol to adjust the fidelity of the second data item, and
      - repeating the applying, analyzing, and evaluating steps; and
    - applying the modified security protocol to the first data item.

13. The computer system of claim 12, wherein the computer module is further configured for performing the step of: sending the second data item to the second computerized entity if the at least one comparison measure satisfies the threshold criterion.

14. The computer system of claim 12, wherein the computer system includes a gateway installed between the first and second entities, and the first data item is sent from the first computerized entity to the second computerized entity via the gateway.

15. The computer system of claim 12, wherein the computer system includes a server installed between the first and second entities, and the first data item is sent from the first computerized entity to the second computerized entity via the server.

16. A method for adjusting the security level of data items received on a first computerized entity from a second computerized entity over a network, comprising the steps of:
- receiving a first data item from the second computerized entity;
- applying a security protocol, that applies rules and policies, to the first data item to create a second data item, wherein each of the first and second data items has an associated fidelity, and wherein the second data item is of lower fidelity than the first data item;
- determining if the applying the security protocol satisfies a threshold criterion; and
- analyzing the second data item against the first data item by comparing a rendered version of the second data item with a rendered version of the first data item to form at least one comparison measure of the second data item if the applying the security protocol satisfies the threshold criterion, and modifying the security protocol to adjust the fidelity of the second data item and subsequently repeating the applying and determining steps if the applying the security protocol dissatisfies the threshold criterion; and
- applying the modified security protocol to the first data item.

17. The method of claim 16, wherein the threshold criterion includes at least one of: an amount of resources consumed by the applying the security protocol, an absolute amount of disk space consumed by the second data item, a ratio between the amount of disk space consumed by the second data item and the first data item, and an amount of time taken to perform the applying the security protocol.

* * * * *